United States Patent
Cheaz et al.

(10) Patent No.: US 10,602,462 B1
(45) Date of Patent: Mar. 24, 2020

(54) HOTSPOT CHANNEL CONGESTION MITIGATION

(71) Applicant: INTERNATIONAL BUSINESS MACHINES CORPORATION, Armonk, NY (US)

(72) Inventors: Nixon Cheaz, Cary, NC (US); Akanksha Pramod Joshi, Bellevue, WA (US); Ariel Borochov, Raleigh, NC (US); Sarah L. Talty, Durham, NC (US); Nanditha Sivashankar, Morrisville, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/206,369

(22) Filed: Nov. 30, 2018

(51) Int. Cl.
*H04W 28/08* (2009.01)
*H04W 52/34* (2009.01)
(Continued)

(52) U.S. Cl.
CPC ......... *H04W 52/343* (2013.01); *H04W 28/08* (2013.01); *H04W 48/06* (2013.01);
(Continued)

(58) Field of Classification Search
CPC ... H04W 48/20; H04W 76/11; H04W 84/042; H04W 84/18; H04W 28/08;
(Continued)

(56) References Cited

U.S. PATENT DOCUMENTS 9,197,981 B2  11/2015  Shin et al.
9,736,789 B2   8/2017  Xia et al.
(Continued)

FOREIGN PATENT DOCUMENTS

WO     2018006623 A1    1/2018

OTHER PUBLICATIONS

Ngo, T., "Why Wi-Fi Stinks—and How to Fix It," IEEE Spectrum, vol. 53, No. 7, pp. 44-50, Jun. 28, 2016, retrieved from the Internet: <http://spectrum.ieee.org/telecom/wireless/why-wifi-stinksand-how-to-fix-it>, 8 pg.

(Continued)

*Primary Examiner* — Tu X Nguyen
(74) *Attorney, Agent, or Firm* — Cuenot, Forsythe & Kim, LLC

(57) ABSTRACT

Mitigating channel congestion, or crowding, that degrades the performance capabilities of a venue-provided access point, or hotspot, can include identifying, with a mobile communication device, the venue-provided access point. Additionally, mitigating channel congestion can also include establishing a mobile hotspot with the mobile communication device. The mobile communication device can establish the mobile hotspot on a channel different from a channel used by the venue-provided access point. Mitigating channel congestion can also include reducing a signal radius of the mobile communication device by reducing transmission power of the mobile communication device.

17 Claims, 6 Drawing Sheets

(51) Int. Cl.
*H04W 48/06* (2009.01)
*H04W 72/04* (2009.01)
*H04W 48/16* (2009.01)

(52) U.S. Cl.
CPC ....... *H04W 48/16* (2013.01); *H04W 72/0426* (2013.01); *H04W 72/0433* (2013.01); *H04W 72/0473* (2013.01); *H04W 72/0486* (2013.01)

(58) Field of Classification Search
CPC   H04W 28/0284; H04W 4/21; H04L 63/0272; H04L 12/2801; H04L 61/3015
USPC ........................................ 455/11.1, 13.4, 522
See application file for complete search history.

(56) References Cited

U.S. PATENT DOCUMENTS

| | | | |
|---|---|---|---|
| 2015/0282195 A1* | 10/2015 | Farhadi | H04W 72/085 370/229 |
| 2017/0085417 A1* | 3/2017 | O'Reirdan | H04L 41/0668 |
| 2017/0347323 A1 | 11/2017 | Chen | |

OTHER PUBLICATIONS

"Why 'over the counter' hotspots crash and burn at trade shows," [online] Trade Show News Network, Aug. 31, 2013, retrieved from the Internet: <http://www.tsnn.com/news-blogs/why-over-counter-hotspots-crash-and-burn-trade-shows>, 7 pg.

Morran, C., Company Faces $718K Fine for Blocking WiFi Hotspots At Baltimore Convention Center, [online] Consumerist, © 2018 Consumer Reports, Nov. 2, 2015, retrieved from the Internet: <https://consumerist.com/2015/11/02/company-faces-718k-fine-for-blocking-wifi-at-baltimore-conventioncenter/>, 5 pg.

\* cited by examiner

HOTSPOT CHANNEL CONGESTION MITIGATION

BACKGROUND

The present disclosure relates to the field of wireless communications, and more particularly, to wireless communications using public and private access points.

Wireless mobile hotspots are widely acknowledged as providing an extremely adaptable mechanism for accessing the Internet from virtually any location. Whether as a stand-alone product or feature of a mobile device such as a smartphone, a mobile hotspot is an easy, convenient, and cost-effective mechanism for creating a personal Wi-Fi network from nearly anywhere. This convenience and efficiency are perhaps key contributors to the growth in network usage generally, which seems poised to continue well into the foreseeable future. As noted in a recent IEEE *Spectrum* article, there are currently an estimated 6.4 billion network-connected devices around the globe, and by 2020, that number is expected to reach 20.8 billion.

SUMMARY

A method includes identifying, with a mobile communication device, a venue-provided access point. Additionally, the method can include establishing a mobile hotspot with the mobile communication device on a channel different than a channel used by the venue-provided access point. The method also can include reducing a signal radius of the mobile communication device by reducing transmission power of the mobile communication device.

A system includes a processor programmed to initiate executable operations. The operations include identifying with a mobile communication device a venue-provided access point. Additionally, the operations can include establishing a mobile hotspot with the mobile communication device on a channel different than a channel used by the venue-provided access point. The operations also can include reducing a signal radius of the mobile communication device by reducing transmission power of the mobile communication device.

A computer program product includes a computer readable storage medium that stores program code. The stored program code is executable by a data processing system to initiate operations that can include identifying, with a mobile communication device, a venue-provided access point. Additionally, the operations can include establishing a mobile hotspot with the mobile communication device on a channel different than a channel used by the venue-provided access point. The operations also can include reducing a signal radius of the mobile communication device by reducing transmission power of the mobile communication device.

DETAILED DESCRIPTION

The present disclosure relates to wireless communications, particularly network communications via mobile hotspots.

A public access point is a device, at any geographic location, with which an individual can connect a computing device to the Internet or, indeed, any individual network. Typically, network access is achieved using a Wi-Fi connection through a wireless local area network (WLAN) router connected to the high-speed backbone of an Internet service provider (ISP). A mobile hotspot, by contrast, can be created using a smartphone or other mobile communication device (e.g., mobile wireless router) whose connectivity is through a service provider that provides Internet access to any device (e.g., laptop computer) connected to the mobile communication device via Bluetooth pairing, a wired connection, or over the same Wi-Fi network.

Different venues, from coffee shops to convention centers, often provide public access points. A public access point can offer advantages to users seeking network access. Users seeking network access in a high-density venue (e.g., a convention center as opposed to a small coffeehouse), however, may find that Wi-Fi channel congestion from personal hotspots slows the data rate of the access point provided by the venue.

Often times, if the venue is a large meeting place like a convention center hosting a convention, trade show, or similar such gathering with a large number of attendees, the data rate of a venue-provided access point, can drop as multiple users set up their own personal hotspots thereby creating Wi-Fi congestion. This prompts even more users to set up their own personal hotspots, creating even more Wi-Fi congestion and further slowing the Wi-Fi data rate of the venue-provided access point. The result is a vicious cycle.

The present disclosure pertains to methods, systems and computer program products that can mitigate Wi-Fi channel congestion. Using the methods, systems, and computer program products described herein, multiple devices cooperate instead of compete for network access within a venue hosting a large number of users.

The methods, systems, and computer program products described herein can be applied in the context of a number of different network environments. These are described in various embodiments in the following paragraphs.

Figure 1:
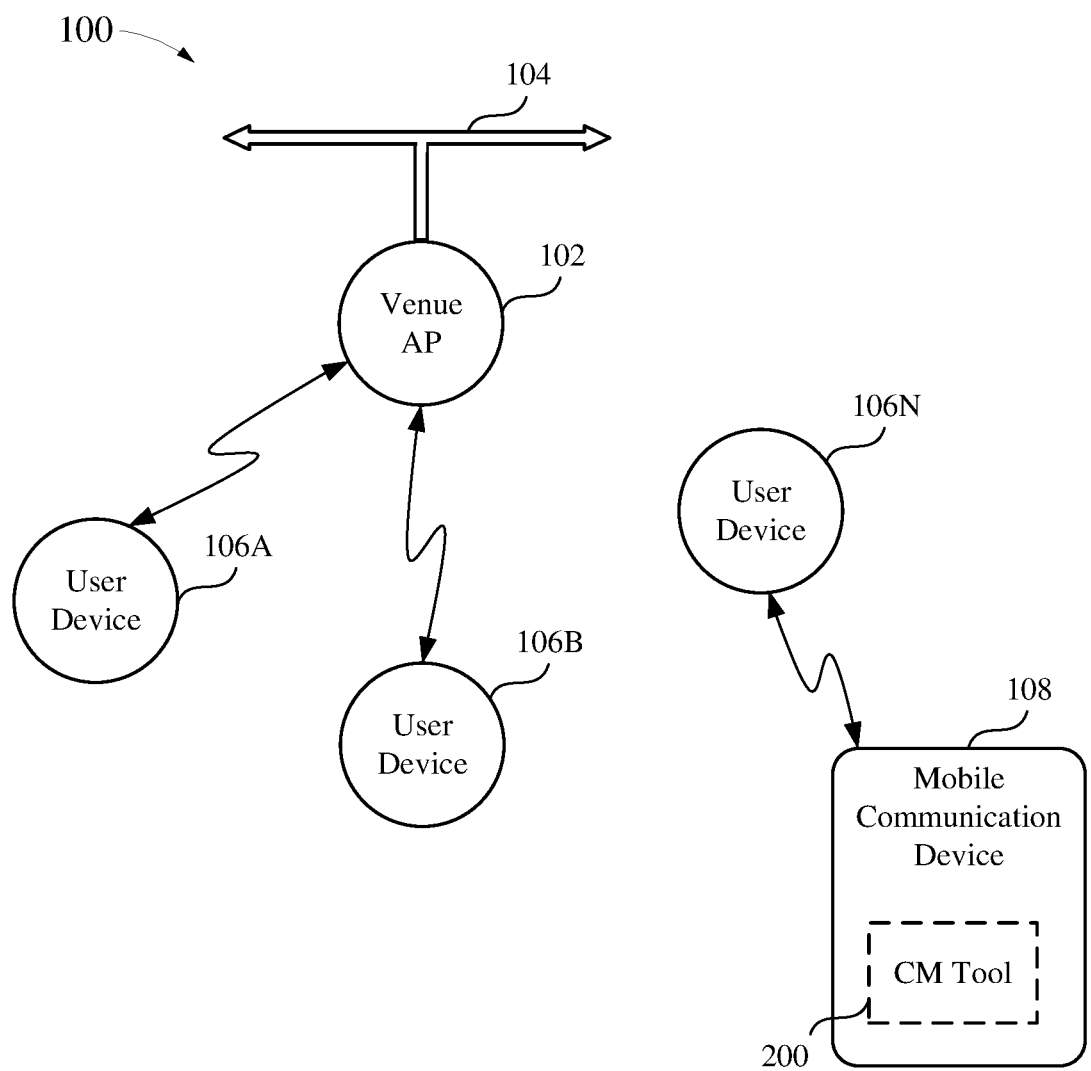
FIG. 1 depicts an example computing environment according to an embodiment of the present invention.

Referring initially to FIG. 1, an example network environment 100 is depicted. Network environment 100 illustratively includes a venue-provided access point (AP) 102. Venue-provided AP 102 may be located midst a large gathering such as a convention or tradeshow. Illustratively, the venue-provided AP 102 is communicatively coupled to a high-speed backbone of a wired LAN 104. The venue-provided AP 102 can include a router communicatively coupled to the Internet, or alternatively, the venue-provided AP 102 can be connected to an external router. Networking environment 100 also illustratively includes multiple user devices (only two of which are explicitly shown, devices 106A and 106B), which obtain network access (e.g., to the Internet) via wireless communication links to AP 102. The user devices can be laptop computers, tablets, or other data processing system capable of establishing a wireless connection to an access point or mobile hotspot. As is typical in such an environment, networking environment 100 can comprise numerous network channels identified by a logical network service set identifier (SSID), which can be zero to 32 bytes in length under applicable IEEE 802.11 standards. (For convenience, an SSID can be any combination of alpha-numeric characters and thus, typically, is a descriptive or fanciful name.)

An n-th device among the plurality of user devices (including the two explicitly shown as 106A and 106B) is user device 106N. User device 106N illustratively connects to a mobile communication device 108 for creating a wireless hotspot. Mobile communication device 108 can be a smart phone, mobile wireless router, or any other mobile communication device for creating a wireless Wi-Fi hotspot through which a user device, such as a laptop or table, can connect to the Internet. Mobile communication device 108 illustratively operates in conjunction with Wi-Fi congestion mitigation (CM) tool 200 implemented as software in the device. In particular embodiments, CM tool 200 is implemented as firmware in the device.

Figure 2:
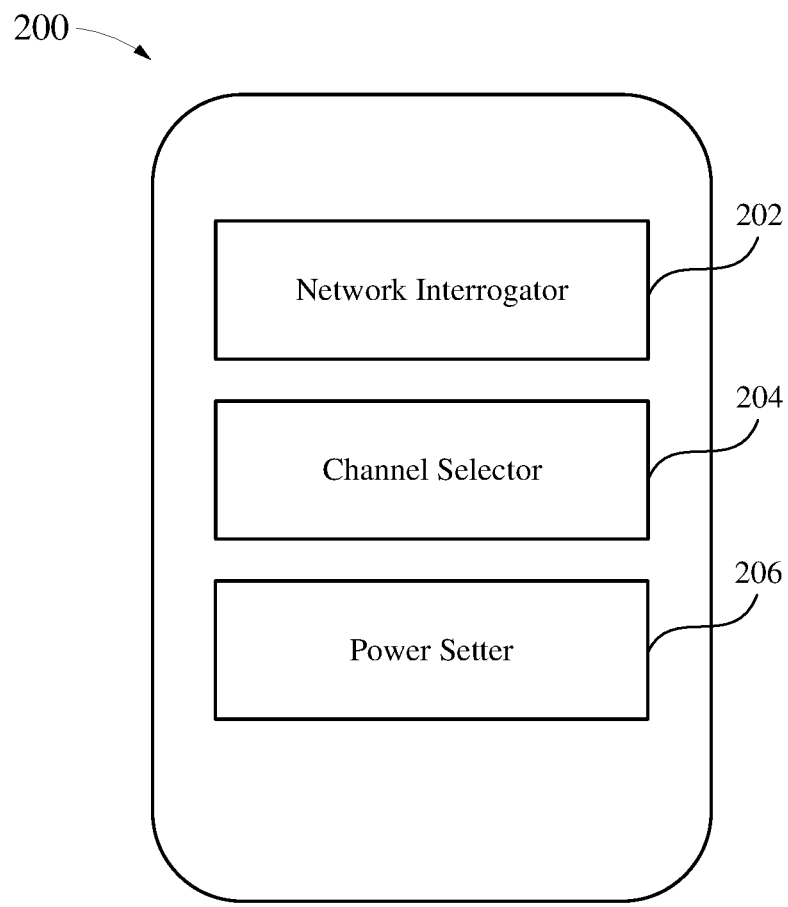
FIG. 2 depicts a channel congestion mitigation tool according to an embodiment of the present invention.

Referring additionally to FIG. 2, CM tool 200 illustratively includes network interrogator 202, channel selector 204, and power setter 206. CM tool 200 in various embodiments can be implemented in dedicated, hardwired circuitry, as processor-executable code, or any combination of hardwired circuitry and processor-executable code.

Initially, upon powering up a device in which CM tool 200 is incorporated, network interrogator 202 interrogates the SSID-indicated networks within signal distance. Based on the interrogation, a list of MAC addresses of users on each SSID-indicated network is obtained by network interrogator 202. Network interrogator 202 determines the SSID-indicated network that is most likely the venue-provider's AP.

In one embodiment, network interrogator 202 identifies the venue-provided AP 102 based on the assumption that in a venue such as a convention center holding a convention or tradeshow with a very large attendance, the venue-provided AP 102 will have the greatest number of users. Accordingly, network interrogator 202 can arbitrarily identify a first SSID-indicated network as the venue-provided AP and initiate a sequential pairwise comparison, beginning with the first network and a second SSID-indicated network. Whichever of the pair (first or second SSID-indicated network) has the greatest number of users is now identified as the venue-provided AP 102 and then compared with the number of users on a third SSID-indicated network. The pairwise comparison can continue until every SSID-indicated network has undergone a comparison and the network having the greatest number of users is identified as the venue-provided AP 102. An example process for determining the venue-provided AP is described in greater detail in connection with FIG. 7.

In a different embodiment, network interrogator 202 can broadcast a request that the venue-provided AP 102 identify itself. In yet another embodiment, network interrogator 202 can search a network database comprising a list of venues and corresponding SSIDs of venue-provided APs and identify the venue-provided AP 102 from the list. The list can be maintained on a network-accessible server on which venues voluntarily register their respective access points. In still another embodiment, the network interrogator 202 can initially broadcast an identification request and/or search a network-accessible database, and if unable to identify the venue-provided AP 102, then initiate the pairwise search described above. Though example embodiments are described where a single venue-provided AP is discussed, in other embodiments, there may be more than one venue-provided AP. In such cases, CM tool 200 (e.g., network interrogator 202) is capable of identifying each such venue-provided AP.

Optionally, the hotspot channel can be intermittently checked by mobile communication device 108 to determine that it is not sharing the channel with venue-provided AP 102. This can be done by repeating the process performed by the network interrogator 202 initially to determine the SSID-indicated network corresponding to venue-provided AP 102. If it is determined that the hotspot channel is being shared with the venue-provided AP 102, then the channel selector 204 again establishes a hotspot with mobile communication device 108 using a channel different than the channel used by the venue-provided AP 102 or venue-provided APs if the venue provides more than one AP.

Power setter 206 reduces the power of mobile communication device 108 once the hotspot is established. Power setter 206 can cause power to be reduced in mobile communication device 108 until reaching a threshold level (e.g., −67 to −70 decibel-milliwatts (dBm)).

In one embodiment, power setter 206 can take into account the number of other devices sharing a channel with the mobile communication device 108 or on a nearby channel. In this sense a device is "nearby" another device if the signal strength of one device is sufficient to cause wireless signal interference with the other device. A mobile communication device's power can be reduced by power setter 206 iteratively in discrete increments, each increment based on the number of devices within signal range such that power is reduced faster the more devices sharing the same channel or otherwise near enough to create signal interference. For example, each reduction can equal a fixed decrement (e.g., 2 dBm) times the number of devices identified as nearby.

In accordance with this embodiment, power setter 206 determines the number of communicating devices within signaling distance, computes an amount by which to reduce the mobile communication device's power based on the number of nearby communicating devices and determines whether the reduced power level is nonetheless sufficient for the mobile communication device to maintain network access. Thus, if the level is above the threshold minimum (e.g., −67 dBm to −70 dBm), then the power of the mobile communication device is reduced. Otherwise, the power is set to the minimum threshold level. If no nearby communicating devices are identified before power is reduced to the minimum threshold, then the power level of the mobile communication device need not be reduced and thus remains above the minimum threshold (e.g., −67 to −70 dBm).

For example, assuming the mobile communication device's power is initially −30 dBm when power setter 206 identifies 10 nearby devices, if power is reduced in 2 dBm increments, then the power setter will determine that power can be reduced to −50 dBm and still remain above the minimum threshold. In this scenario, if power is now set at −50 dBm and only 5 devices are now nearby, the subsequent reduction is a smaller reduction of −10 dBm. In particular embodiments, any of the parameters according to which power setter 206 determines power levels, including the minimum threshold and rate at which the power setter changes power levels, can be specified by the user.

Participants at a conference, convention, or tradeshow who utilize CM tool 200 relieve channel congestion by remaining clear of an overcrowded venue-provided access point. But without an enforcement mechanism to ensure that all participants use the system, there is an inevitable risk of free riding. That is, users that relieve channel congestion by forsaking access to the venue-provided access point inevitably make accessing the now less-channel congested access point more appealing. One way to mitigate the free-rider problem is to program the CM tool 200 to cause the mobile communication device 108 to notify the venue-provider's system when it is not connected with the venue-provided AP. During a convention or tradeshow event, the venue provider can periodically broadcast a message identifying those users who have and have not adopted the channel allocation regime provided by CM tool 200 users. The intent is to discourage free riding by publicly identifying those users not cooperating in others' efforts to mitigate Wi-Fi channel congestion.

Figure 3:
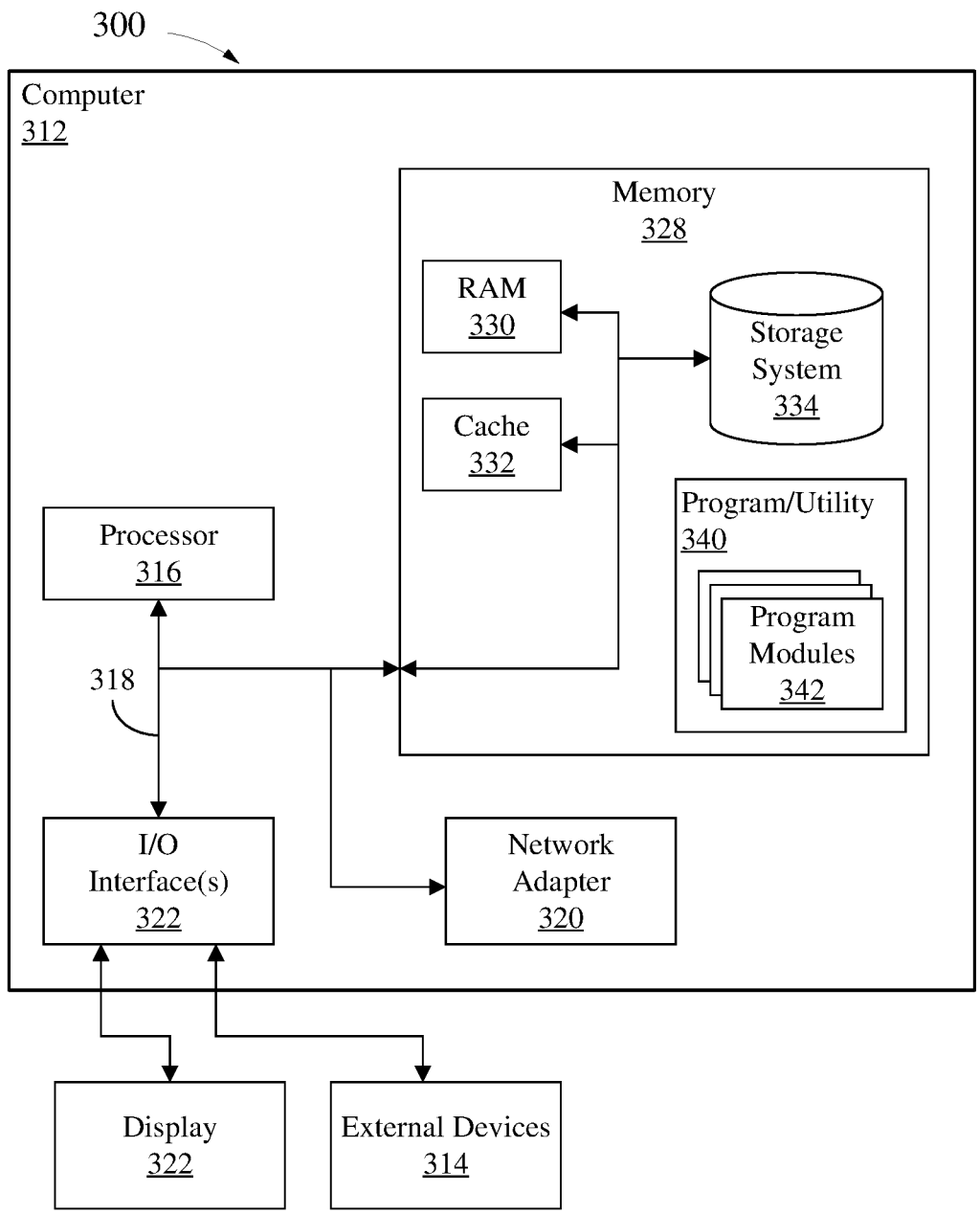
FIG. 3 depicts a user device according to an embodiment of the present invention.

Referring now to FIG. 3, a schematic of an example of data processing system 300 is shown. Data processing system 300 is only one example of a suitable user device and is not intended to suggest any limitation as to the scope of use or functionality of embodiments of the invention described herein. Regardless, data processing system 300 is capable of being implemented and/or performing any of the functionality set forth hereinabove.

Data processing system 300 includes a computer 312. Computer 312 may be described in the general context of computer system-executable instructions, such as program modules, being executed by a computer or computing system. Generally, program modules may include routines, programs, objects, components, logic, data structures, and so on that perform particular tasks or implement particular abstract data types.

As shown in FIG. 3, computer 312 in data processing system 300 is shown in the form of a general-purpose computing device. The components of computer 312 may include, but are not limited to, one or more processors 316, a memory 328, and a bus 318 that couples various system components including memory 328 to processor 316.

Bus 318 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer 312 typically includes a variety of computer-readable media. Such media may be any available media that is accessible by computer 312, and includes both volatile and non-volatile media, removable and non-removable media.

Memory 328 can include computer-readable media in the form of volatile memory, such as random-access memory (RAM) 330 and/or cache memory 332. Computer 312 may further include other removable/non-removable, volatile/non-volatile computer storage media. By way of example, storage system 334 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 318 by one or more data media interfaces. As will be further depicted and described below, memory 328 may include at least one program product having a set (e.g., at least one) of program modules that are configured to carry out the functions of embodiments of the invention.

Program/utility 340, having a set (at least one) of program modules 342, may be stored in memory 328 by way of example, and not limitation, as well as an operating system, one or more application programs, other program modules, and program data. Each of the operating system, one or more application programs, other program modules, and program data or some combination thereof, may include an implementation of a networking environment. Program modules 342 generally carry out the functions and/or methodologies of embodiments of the invention as described herein. For example, one or more of the program modules may include system CM tool 200 or portions thereof.

Program/utility 340 is executable by processor 316. Program/utility 340 and any data items used, generated, and/or operated upon by data processing system 300 are functional data structures that impart functionality when employed by data processing system 300. As defined within this disclosure, a "data structure" is a physical implementation of a data model's organization of data within a physical memory. As such, a data structure is formed of specific electrical or magnetic structural elements in a memory. A data structure imposes physical organization on the data stored in the memory as used by an application program executed using a processor.

Computer 312 may also communicate with one or more external devices 314 such as a keyboard, a pointing device, a display 324, etc.; one or more devices that enable a user to interact with computer 312; and/or any devices (e.g., network card, modem, etc.) that enable computer 312 to communicate with one or more other computing devices. Such communication can occur via Input/Output (I/O) interfaces 322. Computer 312 can communicate with one or more networks such as a local area network (LAN), a general wide area network (WAN), and/or a public network (e.g., the Internet) via network adapter 320. As depicted, network adapter 320 communicates with the other components of computer 312 via bus 318. In particular embodiments, network adapter 320 may represent one or more wireless transceivers. The wireless transceivers may include short range wireless transceivers (e.g., Bluetooth and/or WiFi) or longer range wireless transceivers (e.g., mobile and/or cellular). It is noted that although not shown, other hardware and/or software components could be used in conjunction with computer 312. Examples include, but are not limited to, the following: microcode, device drivers, redundant processing units, external disk drive arrays, RAID systems, tape drives, and data archival storage systems.

While data processing system 300 is used to illustrate an example of a user device, it should be appreciated that a computer system using an architecture the same as or similar to that shown in FIG. 3 may be used to perform the various operations described herein.

Figure 4:
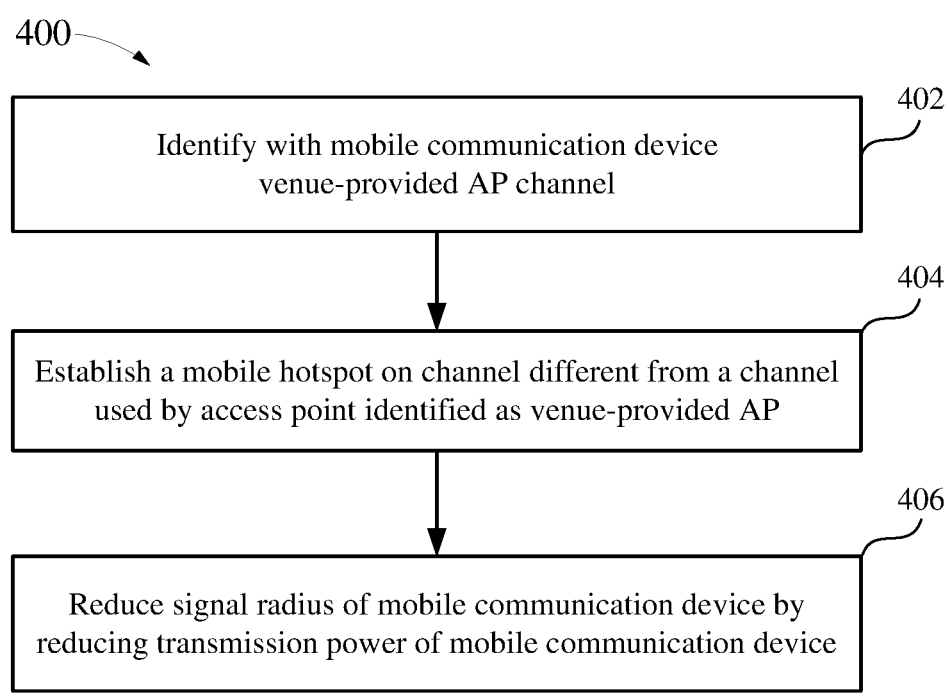
FIG. 4 is flowchart of a method of mitigating channel congestion according to an embodiment of the present invention.

FIG. 4 is a flowchart of a method 400 of mitigating Wi-Fi congestion according to one embodiment. Method 400 can be performed by a system the same or similar to the system described in connection with FIGS. 1-3. Method 400 can begin with a user looking to gain network access at a venue hosting a large gathering such as a convention or tradeshow. A mobile communication device, utilizing the system, identifies an access point provided by the venue host at 402. The mobile communication device establishes a mobile hotspot at 404 on a channel different than a channel used by the venue-provided access point. At 406, the system reduces the signal radius of the mobile communication device by reducing the transmission power of the mobile communication device.

Identifying the venue-provided access point can comprise automatically determining the number of devices connected to each SSID-indicated access point and identifying the venue-provided access point as the one to which the greatest number of users is connected. The identification follows from the reasonable assumption that the access point with the greatest number of users is most likely the venue-provided access point.

Figure 5:
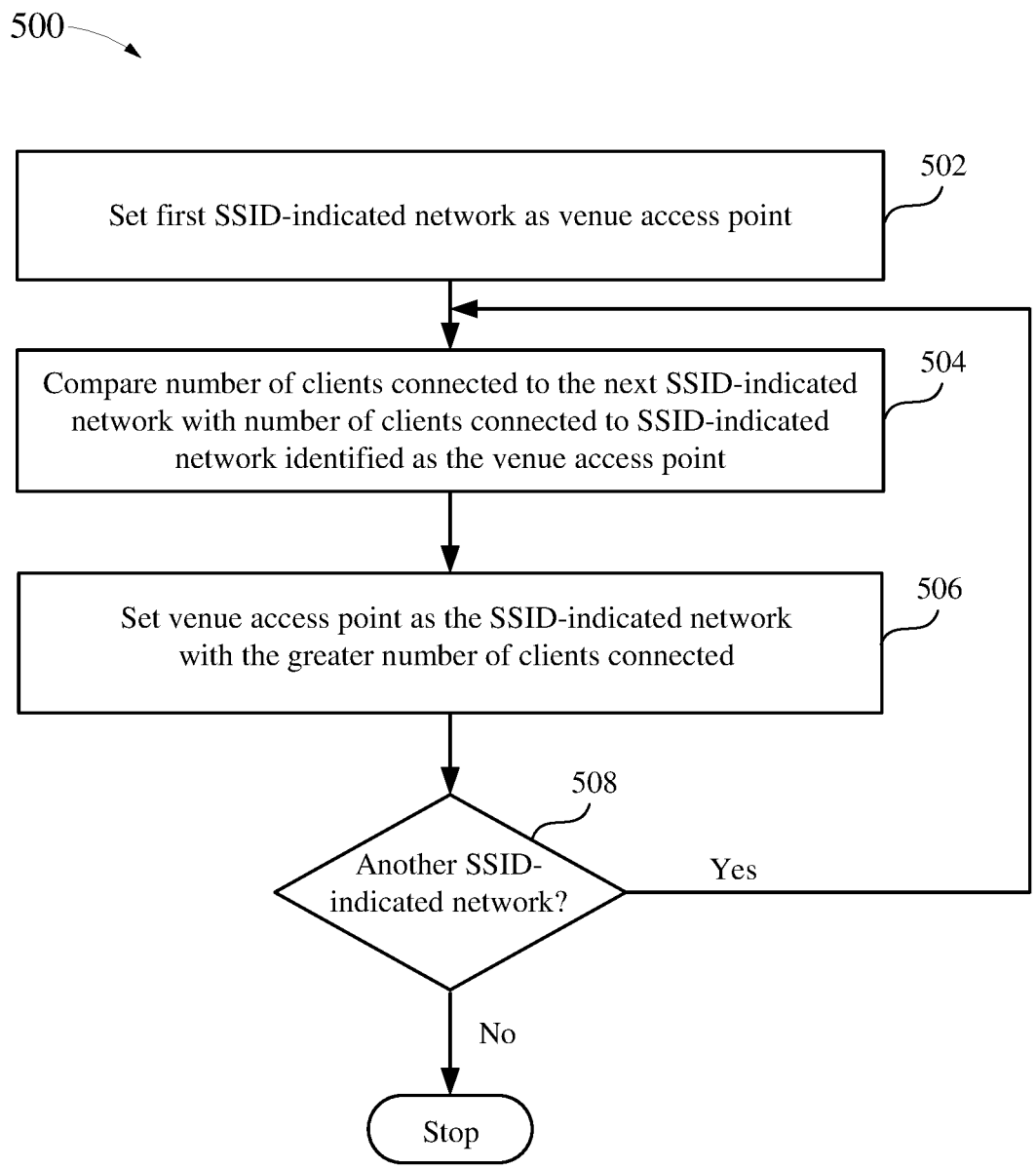
FIG. 5 is flowchart of one aspect of a method of mitigating channel congestion according to an embodiment of the present invention.

FIG. 5 is a flowchart of method 500, according to another embodiment, of identifying the access point that is most likely the venue-provided access point. Method 500 can be performed by a system the same or similar to the system described in connection with FIGS. 1-3. In one or more embodiments, method 500 may be performed to implement block 402 of FIG. 4. The system begins with an initialization, identifying an arbitrarily selected first SSID as corresponding to the venue-provided access point at 502. The number of users connected to the first SSID-indicated network are compared with the number connected to a next SSID-indicated network (a second arbitrarily selected one) at 504. Of the two, the SSID-indicated network to which the greatest number of users is connected is selected as the venue-provided access point at 506. The pairwise comparisons continue as long as it is determined at 508 that there remains another SSID-indicated network. When every network corresponding to an identified SSID as been subjected to a comparison, the one having the largest number of connected users is identified at the venue-provided access point.

Additionally, or alternatively, the venue-provided access point can be identified by searching a network-accessible database of registered SSIDs corresponding to different access points provided by different venues. The identification can comprise searching the database of registered SSIDs for one that is revealed by electronically scanning the SSIDs available at the specific venue where the user is located.

In yet another embodiment, the system can receive a notification, broadcast to all potential users at the specific venue, identifying the venue-provided access point. The system can respond by automatically searching for a different SSID to obtain a channel to use in establishing a mobile hotspot.

Another method aspect of mitigating Wi-Fi congestion is reducing the power used by a mobile device. In one embodiment, the system reduces the power to the minimum threshold level (e.g., −67 dBm to −70 dBm) that is nonetheless sufficient to maintain network access. This method takes into account the number of devices nearby. (A communication device is "nearby" relative to another device if the signal strength of one device is sufficient to cause wireless signal interference with the other device.) The power can be reduced in iterative increments, each increment based on the number nearby devices such that power is reduced faster the more devices there are nearby.

Figure 6:
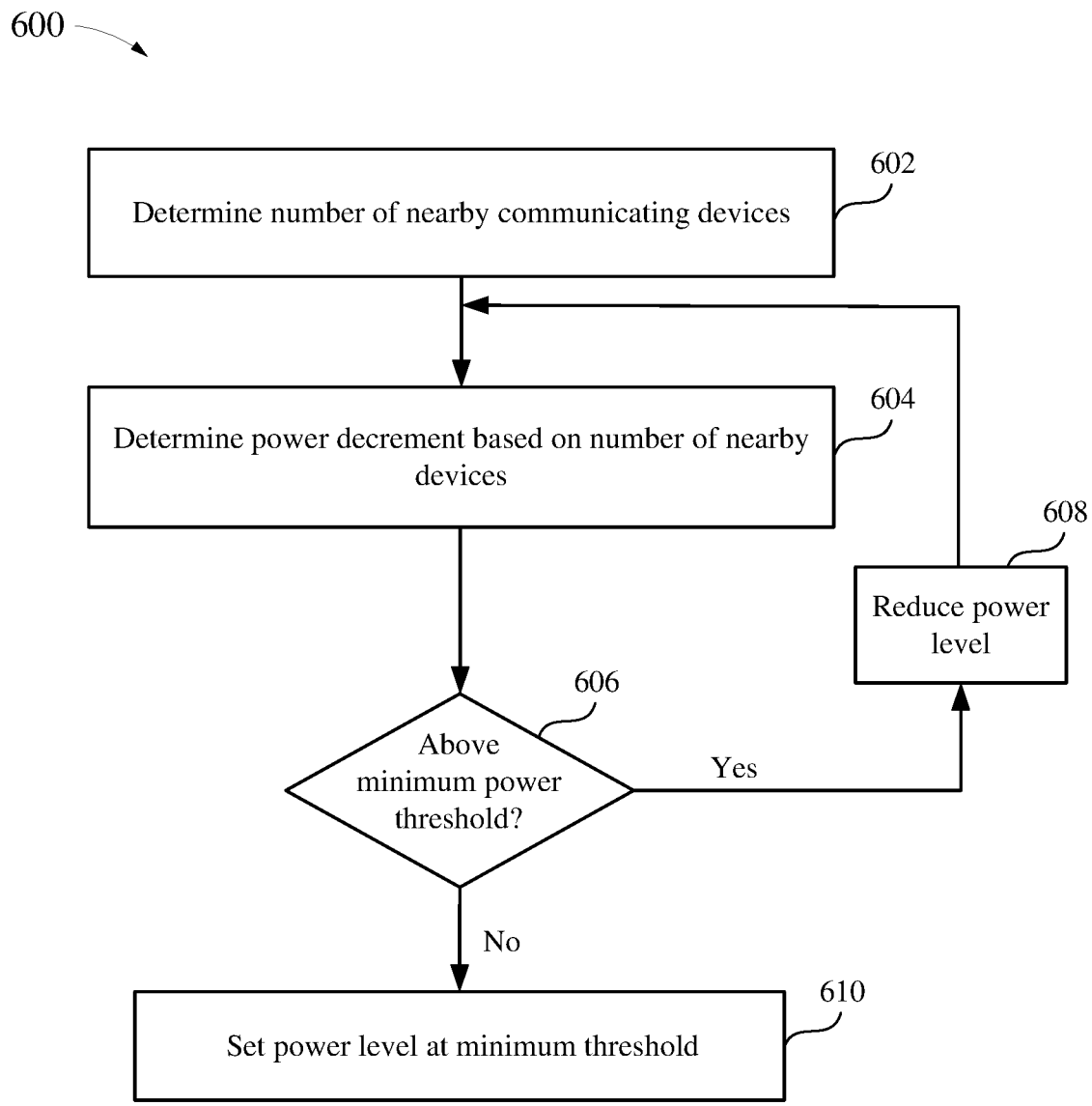
FIG. 6 is a flowchart of another aspect of a method of mitigating channel congestion according to an embodiment of the present invention.

FIG. 6 is a flowchart of an example method 600, according to one embodiment, for reducing the power of a wireless communication device. Optionally, the method can be performed in response to establishing a mobile hotspot upon detecting a venue-provided access point and not otherwise. Method 600 also can be performed by a system the same or similar to the system described in connection with FIGS. 1-3. In one or more embodiments, method 600 may be performed to implement block 406 of FIG. 4. Initially, the system determines the number of communicating devices within signaling distance (thus being, according to definition, nearby communicating devices) at 602. The system determines at 604 an amount by which to reduce the communication device's power based on the number of nearby communicating devices. The power level less the computed decrement is checked at 606. If the level is above the threshold minimum, then the power of the communicating device is reduced at 608. Otherwise, the power is set to the minimum threshold level at 610. If no nearby communicating devices are identified before the system reduces power to the minimum threshold, then the power level of the communication need not be reduced and thus remains above the minimum threshold (e.g., −70 dBm).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIGS. 1-6 are conceptual illustrations allowing for an explanation of the present invention. Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

That which is claimed is:

1. A method, comprising:
identifying, with a mobile communication device, a venue-provided access point (AP);
establishing a mobile hotspot with the mobile communication device on a channel different than a channel used by the AP; and
reducing, based on a number of nearby wireless devices, a signal radius of the mobile communication device by reducing transmission power of the mobile communication device.

2. The method of claim 1, wherein
the identifying the AP comprises determining which among a plurality of SSID-identified access points has a greatest number of connected users.

3. The method of claim 1, wherein
the identifying the AP comprises searching a database and identifying the AP from among a plurality of access points that are each associated with a corresponding venue provider.

4. The method of claim 1, wherein
the identifying the AP comprises receiving a venue provider notification identifying the AP.

5. The method of claim 1, wherein the transmission power of the mobile communication device is reduced in predetermined increments based on the number of nearby wireless devices engaged in wireless communication.

6. The method of claim 1, further comprising automatically conveying a signal notifying the venue provider that the mobile communication device is not seeking to access the AP.

7. A system, comprising:
a processor programmed to initiate executable operations comprising:
identifying, with a mobile communication device, a venue-provided access point (AP),
establishing a mobile hotspot with the mobile communication device on a channel different than a channel used by the AP; and
reducing, based on a number of nearby wireless devices, a signal radius of the mobile communication device by reducing transmission power of the mobile communication device.

8. The system of claim 7, wherein the identifying the AP comprises determining which among a plurality of SSID-identified access points has a greatest number of connected users.

9. The system of claim 7, wherein the identifying the AP comprises searching a database and identifying the AP from among a plurality of access points that are each associated with a corresponding venue provider.

10. The system of claim 7, wherein the identifying the AP comprises receiving a venue provider notification identifying the AP.

11. The system of claim 7, wherein the transmission power of the mobile communication device is reduced in predetermined increments based on the number of nearby wireless devices engaged in wireless communication.

12. A computer program product, comprising:
a computer readable storage medium having program code stored thereon, the program code executable by a data processing system to initiate operations including:
identifying, with a mobile communication device, a venue-provided access point (AP),
establishing a mobile hotspot with the mobile communication device on a channel different than a channel used by the AP; and
reducing, based on a number of nearby wireless devices, a signal radius of the mobile communication device by reducing transmission power of the mobile communication device.

13. The computer program product of claim 12, wherein the identifying the AP comprises determining which among a plurality of SSID-identified access points has a greatest number of connected users.

14. The computer program product of claim 12, wherein the identifying the AP comprises searching a database and identifying the AP from among a plurality of access points that are each associated with a corresponding venue provider.

15. The computer program product of claim 12, wherein the identifying the AP comprises receiving a venue provider notification identifying the AP.

16. The computer program product of claim 12, wherein the transmission power of the mobile communication device is reduced in predetermined increments based on the number of nearby wireless devices engaged in wireless communication.

17. The computer program product of claim 12, wherein a signal notifying the venue provider that the mobile communication device is not seeking to access the AP is automatically conveyed.

* * * * *